United States Patent
John Wilson et al.

(10) Patent No.: US 11,696,240 B2
(45) Date of Patent: Jul. 4, 2023

(54) POWER CONTROL IN FULL DUPLEX COMMUNICATION

(71) Applicant: QUALCOMM Incorporated, San Diego, CA (US)

(72) Inventors: Makesh Pravin John Wilson, San Diego, CA (US); Tao Luo, San Diego, CA (US); Jung Ho Ryu, Fort Lee, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/738,993

(22) Filed: Jan. 9, 2020

(65) Prior Publication Data
US 2020/0229112 A1   Jul. 16, 2020

Related U.S. Application Data

(60) Provisional application No. 62/792,377, filed on Jan. 14, 2019.

(51) Int. Cl.
*H04W 52/24* (2009.01)
*H04W 52/36* (2009.01)
(Continued)

(52) U.S. Cl.
CPC ............ *H04W 52/367* (2013.01); *H04L 5/14* (2013.01); *H04W 52/08* (2013.01);
(Continued)

(58) Field of Classification Search
None
See application file for complete search history.

(56) References Cited

U.S. PATENT DOCUMENTS

2010/0172291 A1*  7/2010  Kim ............ H04W 48/20
                                      370/328
2012/0276942 A1*  11/2012 Mason ......... H04B 17/318
                                      455/522
(Continued)

FOREIGN PATENT DOCUMENTS

WO   WO-2017180031 A1   10/2017

OTHER PUBLICATIONS

International Search Report and Written Opinion—PCT/US2020/013231—ISA/EPO—dated Apr. 20, 2020.

*Primary Examiner* — Jenkey Van
(74) *Attorney, Agent, or Firm* — Holland & Hart LLP

(57) ABSTRACT

Methods, systems, and devices for wireless communications that support power control in full duplex communication are described. In some wireless communications systems, a user equipment (UE) may experience antenna isolation for communication of downlink and uplink data traffic. Based on the antenna isolation, the UE may realize an increased channel capacity for full-duplex communication. As part of the full-duplex communication, the UE may identify characteristics of a potential downlink signal on formatted slots of the channel. The UE may determine an uplink transmit power control configured to account for the characteristics. The determination may include a configured transmit power control for beamformed signaling at the UE, and may be based on signal reception quality for potential downlink transmissions. Based on the determination, the UE may either perform uplink transmission on a resource block allocation of the formatted slots or forgo uplink transmission.

39 Claims, 10 Drawing Sheets

(51) Int. Cl.
*H04L 5/14* (2006.01)
*H04W 52/14* (2009.01)
*H04W 72/0446* (2023.01)
*H04W 52/08* (2009.01)

(52) U.S. Cl.
CPC ....... *H04W 52/143* (2013.01); *H04W 52/242* (2013.01); *H04W 72/0446* (2013.01)

(56) References Cited

U.S. PATENT DOCUMENTS

| | | | |
|---|---|---|---|
| 2014/0078939 A1 | 3/2014 | Shirani-Mehr et al. | |
| 2017/0006554 A1* | 1/2017 | Zeira | H04W 72/0406 |
| 2017/0033916 A1* | 2/2017 | Stirling-Gallacher | H04L 5/14 |
| 2017/0302337 A1* | 10/2017 | Liu | H04B 7/005 |
| 2018/0098291 A1* | 4/2018 | Fodor | H04W 52/367 |
| 2018/0324708 A1* | 11/2018 | Cheng | H04W 52/265 |
| 2020/0059866 A1* | 2/2020 | Takeda | H04W 72/042 |
| 2020/0059867 A1* | 2/2020 | Haghighat | H04W 52/367 |
| 2020/0068502 A1* | 2/2020 | Mao | H04W 52/10 |
| 2020/0296673 A1* | 9/2020 | Ouchi | H04W 52/325 |
| 2020/0383060 A1* | 12/2020 | Park | H04W 52/242 |
| 2021/0091918 A1* | 3/2021 | Lee | H04W 52/243 |
| 2021/0385896 A1* | 12/2021 | Kim | H04W 36/0027 |
| 2023/0080162 A1* | 3/2023 | Ghanbarinejad | H04W 52/16 |

* cited by examiner

POWER CONTROL IN FULL DUPLEX COMMUNICATION

CROSS REFERENCE

The present Application for Patent claims the benefit of U.S. Provisional Patent Application No. 62/792,377 by JOHN WILSON et al., entitled "POWER CONTROL IN FULL DUPLEX COMMUNICATION," filed Jan. 14, 2019, assigned to the assignee hereof, and expressly incorporated herein.

BACKGROUND

The following relates generally to wireless communications, and more specifically to power control in full duplex communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support duplexing schemes for data transmission and reception between wireless devices (e.g., a base station, UE) on a configured communication link. In some examples, the duplexing schemes may require distinct channels for uplink and downlink signaling within sub-bands of a full channel bandwidth spectrum, also referred to herein as frequency division duplex. In other examples, the duplexing schemes may include allocating time slots specific to transmission and reception functions at a perspective wireless device, also referred to herein as time division duplex. Enhancements to resource scalability in wireless communications systems may improve flexibility for isolating uplink and downlink data traffic within a channel and increase channel capacity. However, the described duplexing schemes (i.e., half-duplex schemes) may experience propagation loss, fading characteristics, or latency in communication. Based on the limitations, half-duplex schemes may be insufficient to support increased channel capacity, particularly across diverse frequency bandwidth spectrum resources (i.e., extensions to sub-6 GHz and millimeter wave (mmW) frequency bandwidth spectrum).

SUMMARY

The described techniques relate to improved methods, systems, devices, and apparatuses that support power control in full-duplex communication. Generally, the described techniques provide for signal coordination on an available channel capacity for increased throughput and reduced communication latency between wireless devices. The signal coordination may include techniques for power control of uplink transmissions in full-duplex communication within a single channel.

A UE may support full-duplex communication with a base station over an available channel capacity or carrier. The channel may include one or more configured resource block sets for the UE to simultaneously receive downlink signaling from the base station and perform uplink transmission. The UE may identify one or more parameters associated with a potential downlink signal, including at least a maximum signal to noise ratio (MaxSNR) to decode downlink data. The UE may then evaluate the one or more parameters and determine a transmit power control measurement for uplink transmission on one or more slots formatted for the full-duplex communication. In some examples, determination may include calculating a maximum allowed transmit power for uplink transmission. In other cases, the determination may include identifying a power determination, resource allocation, or power control command at the UE for uplink transmission. Based on the determination, the UE may transmit the uplink signal at the determined transmit power or forgo uplink transmission over the formatted slots.

A method of wireless communication at a UE is described. The method may include identifying a first set of parameters associated with a potential downlink signal from a base station, determining, based on the identifying, a transmit power control for a first uplink signal in full-duplex communication over a carrier, and transmitting, to the base station, the first uplink signal in a first slot formatted for the full-duplex communication.

An apparatus for wireless communication at a UE is described. The apparatus may include a processor, memory in electronic communication with the processor, and instructions stored in the memory. The instructions may be executable by the processor to cause the apparatus to identify a first set of parameters associated with a potential downlink signal from a base station, determine, based on the identifying, a transmit power control for a first uplink signal in full-duplex communication over a carrier, and transmit, to the base station, the first uplink signal in a first slot formatted for the full-duplex communication.

Another apparatus for wireless communication at a UE is described. The apparatus may include means for identifying a first set of parameters associated with a potential downlink signal from a base station, determining, based on the identifying, a transmit power control for a first uplink signal in full-duplex communication over a carrier, and transmitting, to the base station, the first uplink signal in a first slot formatted for the full-duplex communication.

A non-transitory computer-readable medium storing code for wireless communication at a UE is described. The code may include instructions executable by a processor to identify a first set of parameters associated with a potential downlink signal from a base station, determine, based on the identifying, a transmit power control for a first uplink signal in full-duplex communication over a carrier, and transmit, to the base station, the first uplink signal in a first slot formatted for the full-duplex communication.

Some examples of the method, apparatuses, and non-transitory computer-readable medium described herein may further include operations, features, means, or instructions for determining a transmit power control for a second uplink signal in half-duplex communication over the carrier, and transmitting the second uplink signal in a second slot formatted for the half-duplex communication.

In some examples of the method, apparatuses, and non-transitory computer-readable medium described herein, the half-duplex communication may be configured for time division duplex multiplexing or frequency division duplex multiplexing over resources of the carrier.

Some examples of the method, apparatuses, and non-transitory computer-readable medium described herein may further include operations, features, means, or instructions for identifying a second set of parameters associated with the UE, the second set of parameters including at least a power class and a maximum power reduction for the full-duplex communication, and where the determining further includes determining a configured transmit power for the UE based on identifying the first set of parameters and identifying the second set of parameters.

In some examples of the method, apparatuses, and non-transitory computer-readable medium described herein, the configured transmit power includes a maximum allowed transmit power at the UE.

Some examples of the method, apparatuses, and non-transitory computer-readable medium described herein may further include operations, features, means, or instructions for configuring a second set of parameters for a reference power determination associated with the full-duplex communication, and where the determining may be based on the configuring.

In some examples of the method, apparatuses, and non-transitory computer-readable medium described herein, the reference power determination includes an open loop power determination or a closed loop power determination.

Some examples of the method, apparatuses, and non-transitory computer-readable medium described herein may further include operations, features, means, or instructions for identifying a resource assignment of the carrier for the full-duplex communication, and where the determining may be based on identifying the resource assignment.

In some examples of the method, apparatuses, and non-transitory computer-readable medium described herein, the resource assignment includes at least one of a number of resource blocks for the first uplink signal, a number of resource blocks for the potential downlink signal, or a resource block allocation between the first uplink signal and the potential downlink signal.

Some examples of the method, apparatuses, and non-transitory computer-readable medium described herein may further include operations, features, means, or instructions for estimating a pathloss of the potential downlink signal for the full-duplex communication, and where the determining further includes determining a compensation parameter of the transmit power control based on the identifying and the estimating.

In some examples of the method, apparatuses, and non-transitory computer-readable medium described herein, the compensation parameter includes a fractional power control parameter.

Some examples of the method, apparatuses, and non-transitory computer-readable medium described herein may further include operations, features, means, or instructions for configuring a second set of parameters for a power control command associated with the full-duplex communication, and where the determining may be based on the configuring.

In some examples of the method, apparatuses, and non-transitory computer-readable medium described herein, the power control command includes a power control step size for transmitting the first uplink signal in the first slot.

Some examples of the method, apparatuses, and non-transitory computer-readable medium described herein may further include operations, features, means, or instructions for identifying a channel type of the potential downlink signal, and where the determining further includes determining a power reduction for the transmit power control based on identifying the first set of parameters and identifying the channel type.

Some examples of the method, apparatuses, and non-transitory computer-readable medium described herein may further include operations, features, means, or instructions for transmitting, to the base station, a signal indication of the power reduction.

Some examples of the method, apparatuses, and non-transitory computer-readable medium described herein may further include operations, features, means, or instructions for receiving the potential downlink signal on resources of the carrier, and where the identifying may be based on processing the potential downlink signal.

In some examples of the method, apparatuses, and non-transitory computer-readable medium described herein, the identifying further may include operations, features, means, or instructions for determining a maximum signal to noise ratio to decode the potential downlink signal, the maximum signal to noise ratio included in the first set of parameters.

Some examples of the method, apparatuses, and non-transitory computer-readable medium described herein may further include operations, features, means, or instructions for determining the maximum signal to noise ratio may be based on one or more additional parameters of the first set of parameters, the one or more additional parameters including a modulation coding scheme, a code-rate, a transmission quality of service, a modulation format, allocated resource elements, or a transmission configuration indicator state pairing for the full-duplex communication.

In some examples of the method, apparatuses, and non-transitory computer-readable medium described herein, the first set of parameters may be configured at the UE or indicated to the UE via one or more of a radio resource control indication, downlink control information, a control element of medium access control.

In some examples of the method, apparatuses, and non-transitory computer-readable medium described herein, the transmit power control includes a physical uplink shared channel transmission power or a physical uplink control channel transmission power for the full-duplex communication.

In some examples of the method, apparatuses, and non-transitory computer-readable medium described herein, the UE supports millimeter wave communications over a set of configured antennas.

DETAILED DESCRIPTION

Figure 1:
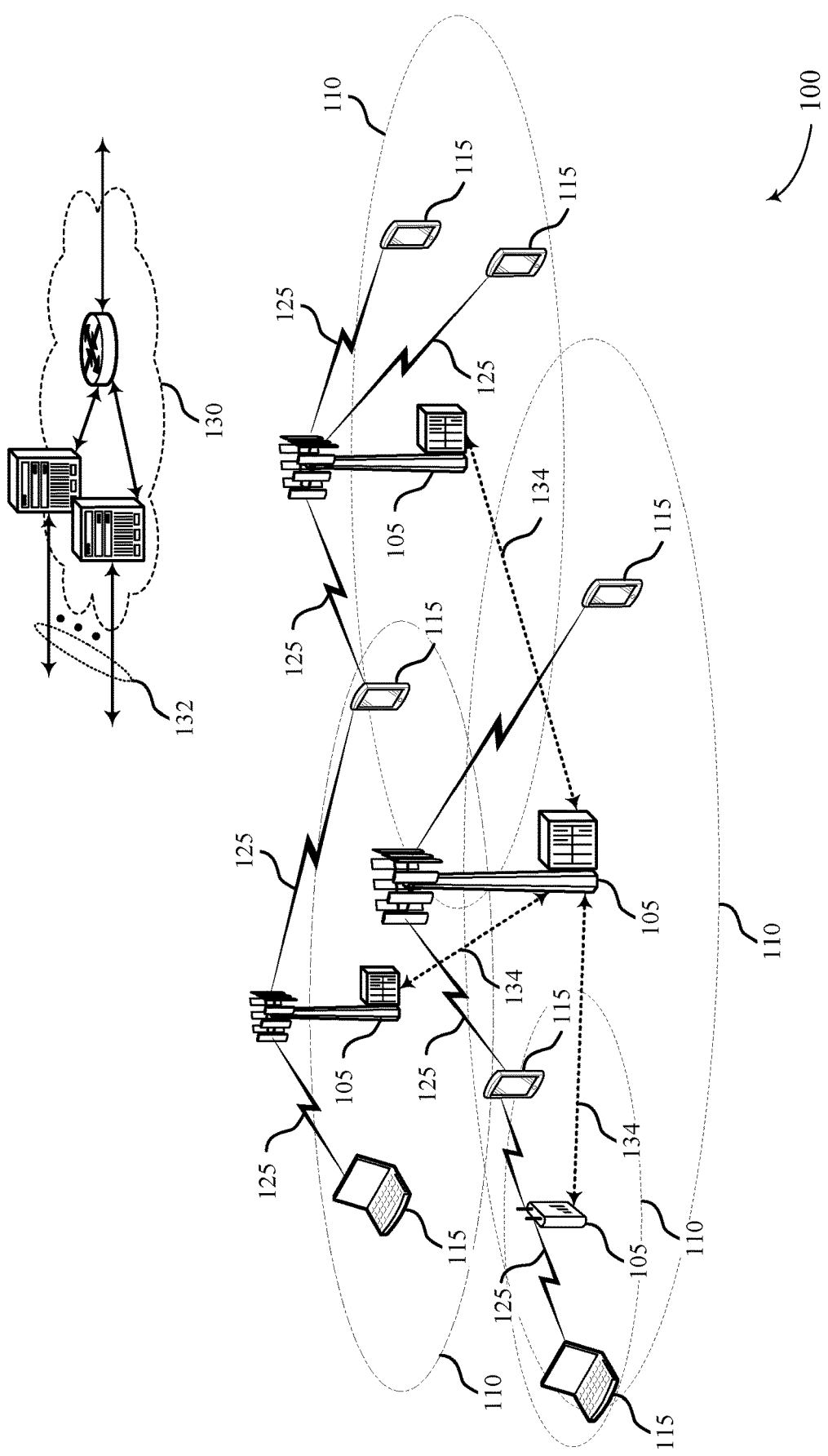
FIG. 1 illustrates an example of a system for wireless communications that supports power control in full duplex communication in accordance with aspects of the present disclosure.

A user equipment (UE) may establish a communication link with a base station and communicate on available resources of a channel. In some wireless communication systems (e.g., extensions to mmW operating bandwidth spectrum) the UE may experience sufficient antenna isolation for communication of downlink and uplink data traffic on the channel. The antenna isolation may be based on a maximum configured signal to noise ratio (SNR) for decoding potential downlink transmissions, while supporting uplink transmission at the UE. In some examples, half-duplex schemes (e.g., frequency division duplex, time division duplex) may experience propagation loss, fading characteristics, or latency in communication on the channel, and may not be sufficient for realizing increased channel capacity provided by the antenna isolation.

Based on the increased channel capacity, the UE may support full-duplex communication over the channel. Full-duplex schemes may include capability for simultaneous reception of downlink signals and transmission of uplink signals on resources of one or more formatted slots. As part of the full-duplex communication, the UE may identify one or more characteristics for determining an uplink transmit power control. The determination may include a configured transmit power control for beamformed signaling at the UE, and may be based on signal reception quality for potential downlink transmissions.

In some examples, the UE may determine a configured transmit power, such as a maximum allowed transmit power, as part of the transmit power control. The UE may determine the configured transmit power based on the maximum configured SNR for downlink data reception. In other examples, the UE may configure one or more parameters of a power determination (e.g., open-loop power determination, closed-loop power determination) or configure a command or rules (e.g., power control command, dropping rules, etc.) for the transmit power control. The UE may perform the configuration based on the full-duplex communication. In other examples, the UE may identify a resource allocation for uplink and downlink resources of the full-duplex communication, or configure a power control parameter (e.g., fractional power control parameter, autonomous power reduction, etc.). The UE may identify the resource allocation or configure the parameters based on a signal type, signal strength, or coding scheme associated with the potential downlink transmission.

Based on the determination, the UE may either perform uplink transmission on a resource block allocation of the formatted slots or forgo uplink transmission. Due to the supported capability for simultaneous transmission and reception on the channel, the full-duplex scheme may enable one or more advantages for communication at the UE. Specifically, the UE may experience increased (e.g., doubled) spectral efficiency in communication on the channel as well as increased throughput and reduced latency in transmission and reception. In addition, the transmit power control determination for full-duplex communications may enable a configured transmit power for uplink signaling without compromising downlink signal reception quality. Beneficially, increasing throughput and reducing latency in transmission and reception may assist one or more transceivers of the UE to perform effective full-duplex communications.

Aspects of the disclosure are initially described in the context of a wireless communications system. Aspects of the disclosure are further illustrated by and described with reference to power control determination at a UE for full-duplex communication. Aspects of the disclosure are further illustrated by and described with reference to a process flow for bidirectional communication between a base station and a UE in relation to power control in full duplex communication. Aspects of the disclosure are further illustrated by and described with reference to apparatus diagrams, system diagrams, and flowcharts that relate to power control in full duplex communication.

FIG. 1 illustrates an example of a wireless communications system 100 that supports power control in full duplex communication in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some examples, UEs 115 may be designed to support critical functions (e.g., mission critical functions), and a wireless communications system 100 may be configured to provide ultra-reliable communications for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may establish communication links 125 with one or more base stations 105 of the wireless communications system 100. The communication links 125 may each contain time and frequency resources for establishing uplink and downlink transmission between the base station 105 and the UE 115. Specifically, the communication links 125 may correspond to a set of channels or carriers spanning one or more sets of resource blocks over a formatted set of slots. The slots may be formatted according to a transmission scheme of the communication, including a configuration of resources for the uplink and downlink transmissions.

In some examples, the UE 115 may communicate with a base station 105 according to a frequency division duplex scheme (i.e., as part of a half-duplex scheme). The frequency division duplex scheme may be based on a slot format for the UE 115, and include distinct channels for uplink and downlink transmission on the frequency bandwidth spectrum of the communication link 125. In addition, the UE 115 may support filtering schemes to ensure transmitter signals at the UE 115 do not enter receiver components and potentially desensitize downlink reception. In some examples, including multi-band environments, the filtering scheme may introduce additional loss at the UE due to the use of multiple filters for communication. The multiple filters may include added size, weight, or cost at the UE. In addition, propagation characteristics between the distinct channels for transmission and reception at the UE may experience fading characteristics.

In other examples, the UE 115 may communicate with a base station 105 according to a time division duplex scheme (i.e., as part of a half-duplex scheme). The time division duplex scheme may be based on a slot format for the UE 115, and include an allocation of assigned uplink and downlink transmission intervals. The assigned transmission intervals (e.g., transmission time intervals (TTIs)) may be within the set of formatted slots and span the frequency resources of the carrier. For example, a slot format may indicate an assignment of uplink or downlink communication at a symbol level within the set of formatted slots. Based on the time division duplex scheme, the UE 115 may experience latency between downlink signal reception and uplink signal transmission. In addition, the UE 115 may experience additional management constraints due to switching between transmission and reception.

In some examples, wireless communications system 100 may support communications enhancements on a communication link 125. The communications enhancements may enable antenna isolation at the UE 115. For example, wireless communications system 100 may correspond to a NR system that may utilize extensions to mmW frequency bandwidth spectrum. Based on the extensions associated with the NR system, UE 115 may experience sufficient antenna isolation for communication of downlink and uplink data traffic on a channel or carrier. Communication on the NR system may support downlink signal reception and uplink signal transmissions on beams of separate antenna arrays or patches (e.g., reception on a front antenna array and transmission on a back antenna array supported at the UE 115). The antenna isolation may be based on a maximum configured SNR for decoding potential downlink transmissions, while supporting uplink transmission at the UE 115.

Based on the antenna isolation, the UE 115 may support full-duplex communication over the channel. A full-duplex scheme may include simultaneous transmission and receive operations at the UE 115 over the channel associated with communication link 125. The slots included in the channel may be formatted for full-duplex communication, and include resource block allocations for downlink reception and uplink transmission. In some examples, the UE 115 may employ the full-duplex scheme according to isolation techniques between incoming and outgoing signals at the antenna ports of UE 115 (e.g., electrical balance isolation). In other examples, the UE 115 may employ the full-duplex scheme according to interference cancellation techniques for transmitted uplink signals (e.g., self-interference cancellation (SIC)).

Support for full-duplex communication may provide advantages for the UE 115 in relation to half-duplex schemes. For example, by employing a full-duplex scheme using a single channel, the UE 115 may utilize the full transmission time and frequency resources in both directions (e.g., uplink and downlink), effectively doubling the spectral efficiency and capacity of the channel. In addition, by using a single channel for communication, fading and propagation characteristics experienced by the UE 115 will be the same for uplink and downlink signaling. In other examples, full-duplex schemes may provide enhanced interference coordination. For example, full-duplex communication on a single channel may reduce air interference delays and provide concise time and phase synchronization techniques, such as coordinated multipoint (CoMP). In addition, uplink transmission and downlink reception on a single channel may reduce filtering overhead at the UE 115 in relation to frequency division duplex.

As described herein, the UE 115 may identify one or more characteristics for determining an uplink transmit power control that supports full-duplex communication. The one or more characteristics may be configured at the UE 115 or indicated via downlink signaling as part of an RRC indication, downlink control information (DCI) signaling, or a MAC control element (CE). The one or more characteristics may include at least a received MaxSNR to decode potential downlink signaling. The determination may include a configured transmit power control for beamformed signaling at the UE 115, and may be based on signal reception quality (e.g., MaxSNR) for potential downlink transmissions. As such, the UE 115 may determine a transmit power control that supports mechanisms for full-duplex communication on the channel. Based on the transmit power determination, the UE 115 may either perform uplink transmission or forgo uplink transmission.

Figure 2:
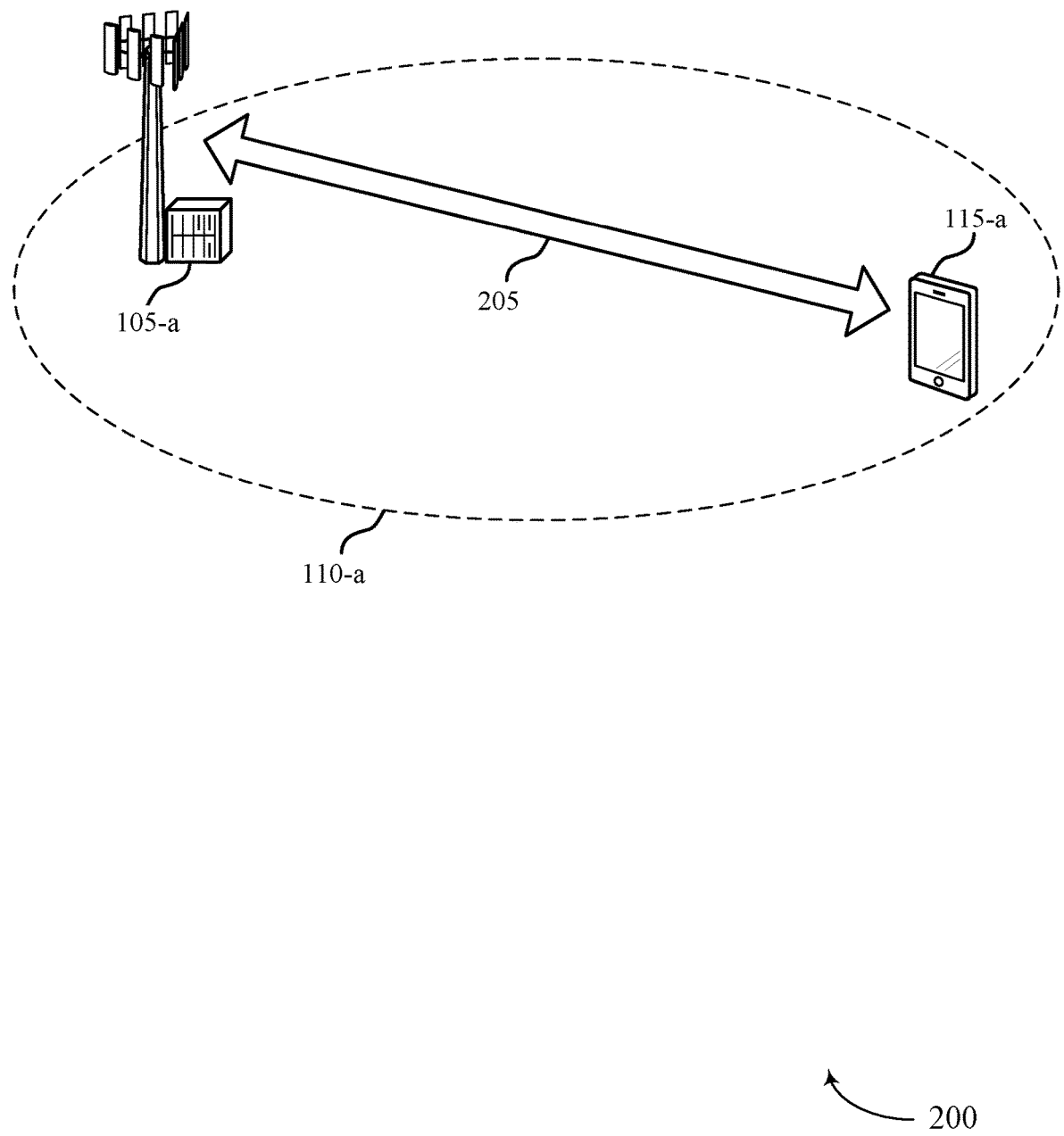
FIG. 2 illustrates an example of a wireless communications system that supports power control in full duplex communication in accordance with aspects of the present disclosure.

FIG. 2 illustrates an example of a wireless communications system 200 that supports power control in full duplex communication in accordance with aspects of the present disclosure. Wireless communications system 200 may include a UE 115-a and base station 105-a, which may be examples of the corresponding devices described with reference to FIG. 1. The UE 115-a and base station 105-a may establish a communication link 205 for communication within a supported coverage area 110-a. As described, wireless communications system 200 may support EHF communications enhancements for the communication link 205. For example, wireless communications system 200 may correspond to a NR system that may utilize extensions to mmW frequency bandwidth spectrum.

As part of the supported extensions (e.g., mmW operations) for wireless communication system 200, the UE 115-a may experience sufficient antenna isolation for communication of downlink and uplink data traffic. For example, the UE 115-a may support downlink signal reception and uplink signal transmission on beams associated with distinct antenna arrays or patches. The antenna isolation may be based on a MaxSNR or block error rate (BLER) target at the UE 115-a for decoding potential downlink transmissions, while supporting uplink transmission. In some examples, the MaxSNR or target BLER may be configured by the UE 115-a. In other examples, the UE 115-a may determine the MaxSNR or target BLER based on one or more received indications from the base station 105-a. For example, the UE 115-a may compute a MaxSNR based on a received modulation coding scheme (MCS), code-rate, modulation format and allocated resource elements on the channel, or a transmission configuration indicator (TCI) state pairing. The UE 115-a may receive the indications via a RRC configuration message, DCI indication, or MAC CE transmission by the base station 105-a.

Based on the antenna isolation, the UE 115-a may support capability for full-duplex communication over resources of communication link 205. The full-duplex scheme may include simultaneous transmission and receive operations at the UE 115-a over a single channel. In some examples, the full-duplex scheme may be part of a slot format on the channel. For example, one or more slots within the channel allocation may be formatted for full-duplex communication with one or more alternative slots configured for half-duplex communication. The one or more slots formatted for full-duplex communication may include a set of resource blocks for sensing the channel (i.e., for downlink signal reception) and a set of resource blocks for uplink signal transmission. The full-duplex scheme may enable increased signaling capacity and enhanced spectral efficiency on the channel due to bidirectional utilization of resources within the full TTI.

The UE 115-a may identify one or more characteristics for determining a transmit power control associated with uplink transmission on the channel. For example, UE 115-a may determine the transmit power control for physical uplink shared channel (PUSCH) message transmission as follows:

$$P_{PUSCH,b,f,c}(i, j, q_d, l) = \min\left\{ \begin{array}{l} P_{CMAX,f,c}(i) \\ P_{O_{PUSCH},b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\} \quad (1)$$

In this equation, $P_{PUSCH,b,f,c}(i,j,q_d,l)$ may be a configured transmit power for a PUSCH transmission occasion i, and may be associated with an active uplink bandwidth power b for a carrier f of a serving cell c (i.e., corresponding to coverage area 110-a). Transmission occasion i may defined by a slot index format of the channel and may use a parameter set configuration with index j and a PUSCH power control adjustment state index 1.

On the one or more slots formatted for full-duplex communication, potential downlink signal reception may be considered in determining a transmit power control $P_{PUSCH,b,f,c}(i,j,q_d,l)$. Specifically, the transmit power control determination may be configured to account for beamformed signaling at the UE 115-a, and may be based on signal reception quality for potential downlink transmissions. For example, $P_{PUSCH,b,f,c}(i,j,q_d,l)$ may be configured to account for potential downlink signal quality in full-duplex communication.

In some examples, the UE 115-a may determine a modification to a configured transmit power. For example, the UE 115-a may determine a modified maximum transmit power $P_{CMAX,f,c}(i)$ based on a downlink signal quality. $P_{CMAX,f,c}(i)$ may be a function of a power class and maximum power reduction values configured at the UE 115-a for the carrier f. For full-duplex communication, UE 115-a may modify $P_{CMAX,f,c}(i)$ based on the MaxSNR for decoding potential downlink data on the channel. The MaxSNR may be configured at the UE 115-a or may be computed as a function of one or more received parameters, including a MCS, code-rate, modulation format, or a TCI state pairing at the UE 115-a. Based on determining the modified maximum transmit power $P_{CMAX,f,c}(i)$, UE 115-a may determine a transmit power control $P_{PUSCH,b,f,c}(i,j,q_d,l)$ that includes consideration for downlink signal reception quality.

In some examples, the UE 115-a may configure one or more parameter values for a reference power directed to base station 105-a, as a means to maintain a targeted power spectral density (PSD). The reference power may correspond to an open loop or closed loop power determination associated with the transmit power control $P_{PUSCH,b,f,c}(i,j,q_d,l)$. For example, the UE 115-a may configure one or more parameter values associated with an open loop power determination $P_{O_{PUSCH},b,f,c}(j)$ for the configuration index j. The configuration may be based on a slot format of the channel, and the new parameters may be configured for one or more slots formatted for full-duplex communication.

In some examples, the UE 115-a may identify resource block allocations for uplink and downlink signaling in determining the transmit power control $P_{PUSCH,b,f,c}(i,j,q_d,l)$. For example, UE 115-a may identify a resource allocation location $M_{RB,b,f,c}^{PUSCH}(i)$ for the transmission occasion i. For full-duplex communication, the resource allocation location may include at least one of a number of resource blocks for the PUSCH transmission, a number of resource blocks for potential downlink reception, or a resource block allocation between the uplink and downlink signaling. Based on the resource allocation locations, the UE 115-a may determine $P_{PUSCH,b,f,c}(i,j,q_d,l)$. For example, in the case of uplink transmission and downlink reception in the same resource block allocation, the UE 115-a may determine a reduced transmit power control $P_{PUSCH,b,f,c}(i,j,q_d,l)$. In contrast, in the case of large resource block separation between uplink configured resources and downlink configured resources within the channel, the UE 115-a may determine a higher transmit power control $P_{PUSCH,b,f,c}(i,j,q_d,l)$.

In some examples, the UE 115-a may determine a compensation parameter based on the full-duplex communication. For example, the UE 115-a may determine a fractional power control $\alpha_{b,f,c}(j)$ of the transmit power control $P_{PUSCH,b,f,c}(i,j,q_d,l)$ based on the potential signal type and strength of downlink signaling on the channel. The fractional power control $\alpha_{b,f,c}(j)$ may be configured by the network, and may allow received SNR at the UE 115-a to decrease as pathloss increases. For example, the fractional power control $\alpha_{b,f,c}(j)$ may be configured to improve air-interface efficiency and increase average cell throughput by reducing intercell interference when UE 115-a is near a cell edge. For full-duplex communication, simultaneous data traffic for uplink and downlink signaling may promote additional levels of interference on the channel. Based on the increased interference, the fractional power control $\alpha_{b,f,c}(j)$ may be configured to be a function of both the pathloss and the signal type and strength for downlink reception at the UE 115-a.

In some examples, the UE 115-a may determine a power control command associated with the full-duplex communication. For example, the UE 115-a may determine a power control command $f_{b,f,c}(i,l)$ for determining the transmit power control $P_{PUSCH,b,f,c}(i,j,q_d,l)$ at transmission occasion i, and according to a PUSCH power control adjustment state index 1. The power control command $f_{b,f,c}(i,l)$ may be based on a slot format of the channel, and may include a power control step size during a slot. For example, the power control command $f_{b,f,c}(i,l)$ may correspond to a first power control step size (in dB) for full-duplex formatted slots within the channel and a second power control step size for half-duplex formatted slots within the channel.

In some examples, the UE 115-a may determine a power reduction for uplink transmission so that the uplink transmission does not impact downlink signaling (e.g., downlink reference signal (RS)) reception. For example, the UE may perform a power reduction for uplink transmission to minimize signaling impact on potential downlink reception. The power reduction may be configured by the UE 115-a to be a function of the type of downlink signaling (e.g., physical downlink control channel (PDCCH) or physical downlink shared channel (PDSCH)), a MCS, or a code rate of the downlink signaling. For example, the UE 115-a may determine a greater power reduction to uplink transmit power for PDSCH message reception relative to PDCCH message reception.

In other examples, the UE 115-a may determine that the signaling interference from uplink transmission may be too significant to support reception of potential downlink signaling. Based on the determination, the UE 115-a may implement one or more rules for dropping uplink signal transmission on the channel during the TTI. The dropping may be a function of a code rate, a quality of service (QoS)

for the data traffic, or the type of channels that are simultaneously transmitted on the channel. For example, the UE 115-*a* may ensure ultra-reliable low latency communication (URLLC) data traffic is transmitted, while dropping enhanced mobile broadband (eMBB) data traffic.

Based on the determination, the UE 115-*a* may either perform uplink transmission on allocated resources of the channel or forgo uplink transmission. For example, the UE 115-*a* may simultaneously sense the channel (i.e., for downlink signaling) and perform PUSCH transmission within the one or more slots formatted for full-duplex communication. The PUSCH transmission may be configured to transmit power control $P_{PUSCH,b,f,c}(i,j,q_d,l)$, and may be based on signal reception quality for potential downlink transmissions, as described herein. In some examples, the UE 115-*a* may signal a transmit power change to the base station 105-*a* (e.g., as part of a physical uplink control channel (PUCCH) transmission or in a later slot formatted for half-duplex communication). In other examples, the UE 115-*a* may forgo uplink transmission based on signaling interference to downlink reception and according to one or more configured dropping rules.

As described, the one or more examples provided for determining a transmit power control associated with PUSCH transmission may be performed either individually or in combination by the UE 115-*a*, as part of a capability for full-duplex communication. In addition, the one or more examples may also be performed by the UE 115-*a* for determining a transmit power control associated with additional uplink transmissions on the channel, including PUCCH transmissions.

For example, UE 115-*a* may determine the transmit power control for PUCCH transmission as follows:

modified maximum transmit power $P_{CMAX,f,c}(i)$, UE 115-*a* may determine a transmit power control $P_{PUCCH,b,f,c}(i,q_u,q_d,l)$ that includes consideration for downlink signal reception quality.

In some examples, the UE 115-*a* may configure one or more parameter values for a reference power directed to base station 105-*a*. The reference power may correspond to an open loop or closed loop power determination associated with the transmit power control $P_{PUCCH,b,f,c}(i,q_u,q_d,l)$. For example, the UE 115-*a* may configure one or more parameter values associated with an open loop power determination $P_{O_{PUCCH},b,f,c}(q_u)$.

In some examples, the UE 115-*a* may identify resource block allocations for uplink and downlink signaling in determining the transmit power control $P_{PUCCH,b,f,c}(i,q_u,q_d,l)$. For example, UE 115-*a* may identify a resource allocation location $M_{RB,b,f,c}^{PUCCH}(i)$ for the transmission occasion i. For full-duplex communication, the resource allocation location may include at least one of a number of resource blocks for the PUSCH transmission, a number of resource blocks for potential downlink reception, or a resource block allocation between the uplink and downlink signaling. Based on the resource allocation locations, the UE 115-*a* may determine $P_{PUCCH,b,f,c}(i,q_u,q_d,i)$.

In some examples, the UE 115-*a* may determine configure an adjustment component of the transmit power control based on the full-duplex communication. For example, the UE 115-*a* may determine a PUCCH transmission power adjustment component $\Delta_{TF,b,f,c}(i)$ of the transmit power control $P_{PUCCH,b,f,c}(i,q_u,q_d,l)$ based on the potential signal type and strength of downlink signaling on the channel. The PUCCH transmission power adjustment component $\Delta_{TF,b,f,c}(i)$ may be configured by configured according to a $$P_{PUCCH,b,f,c}(i, q_u, q_d, l) = \min\left\{ \begin{array}{l} P_{CMAX,f,c}(i) \\ P_{O_{PUCCH},b,f,c}(q_u) + 10 \log_{10}(2^\mu \cdot M_{RB,b,f,c}^{PUCCH}(i)) + PL_{b,f,c}(q_d) + \Delta_{F_{PUCCH}}(F) + \Delta_{TF,b,f,c}(i) + g_{b,f,c}(i, l) \end{array} \right\} \quad (2)$$

In this equation, $P_{PUCCH,b,f,c}(i,q_u,q_d,l)$ may be a configured transmit power for a PUCCH transmission occasion i, and may be associated with an active uplink bandwidth power b for a carrier f of a serving cell c (i.e., corresponding to coverage area 110-*a*). Transmission occasion i may defined by a slot index format of the channel and may use a reference signal index $q_d$ and a PUCCH power control adjustment state index l.

On the one or more slots formatted for full-duplex communication, potential downlink signal reception may be considered in determining a transmit power control $P_{PUCCH,b,f,c}(i,q_u,q_d,l)$. Specifically, the transmit power control determination may be configured to account for beamformed signaling at the UE 115-*a*, and may be based on signal reception quality for potential downlink transmissions. For example, $P_{PUCCH,b,f,c}(i,q_u,q_d,l)$ may be a configured to account for potential downlink signal quality in full-duplex communication.

In some examples, the UE 115-*a* may determine a modification to a configured transmit power. For example, the UE 115-*a* may determine a modified maximum transmit power $P_{CMAX,f,c}(i)$ based on a downlink signal quality. $P_{CMAX,f,c}(i)$ may be a function of a power class and maximum power reduction value configured at the UE 115-*a* for the carrier f. For full-duplex communication, UE 115-*a* may modify $P_{CMAX,f,c}(i)$ based on the MaxSNR for decoding potential downlink data on the channel. Based on determining the PUCCH format. For full-duplex communication, simultaneous data traffic for uplink and downlink signaling may promote additional levels of interference on the channel. Based on the increased interference, the PUCCH transmission power adjustment component $\Delta_{TF,b,f,c}(i)$ may be configured to be a function of both the configured PUCCH format and the signal type and strength for downlink reception at the UE 115-*a*.

In other examples, the UE 115-*a* may determine a power control command associated with the full-duplex communication. For example, the UE 115-*a* may determine a power control command $g_{b,f,c}(i,l)$ for determining the transmit power control $P_{PUCCH,b,f,c}(i,q_u,q_d,l)$ at transmission occasion i, and according to a PUCCH power control adjustment state index l. The power control command $g_{b,f,c}(i,l)$ may be based on higher layer signaling by the base station 105-*a*, and configured to consider downlink signal reception quality based on a slot format of the channel.

As described, the one or more examples provided for determining a transmit power control associated with PUCCH transmission may be performed either individually or in combination by the UE 115-*a*, as part of a capability for full-duplex communication. In addition, the one or more examples may also be performed by the UE 115-*a* for determining a transmit power control associated with additional uplink transmissions on the channel, including sounding reference signal (SRS) transmission.

For example, UE 115-*a* may determine the transmit power control for uplink SRS transmission as follows:

$$P_{SRS,b,f,c}(i, q_s, l) = \min \left\{ \begin{array}{l} P_{CMAX,f,c}(i) \\ P_{O_{SRS},b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{array} \right\} \quad (3)$$

In this equation, $P_{SRS,b,f,c}(i,q_s,l)$ may be a configured transmit power for an uplink SRS transmission occasion i, and may be associated with an active uplink bandwidth power b for a carrier f of a serving cell c (i.e., corresponding to coverage area 110-*a*). Transmission occasion i may defined by a slot index format of the channel and may use a SRS resource set $q_s$ and a SRS power control adjustment state index 1.

On the one or more slots formatted for full-duplex communication, potential downlink signal reception may be considered in determining a transmit power control $P_{SRS,b,f,c}(i,q_s,l)$. Specifically, the transmit power control determination may be configured to account for beamformed signaling at the UE 115-*a*, and may be based on signal reception quality for potential downlink transmissions. For example, $P_{SRS,b,f,c}(i,q_s,l)$ may be configured to account for potential downlink signal quality in full-duplex communication.

Figure 3:
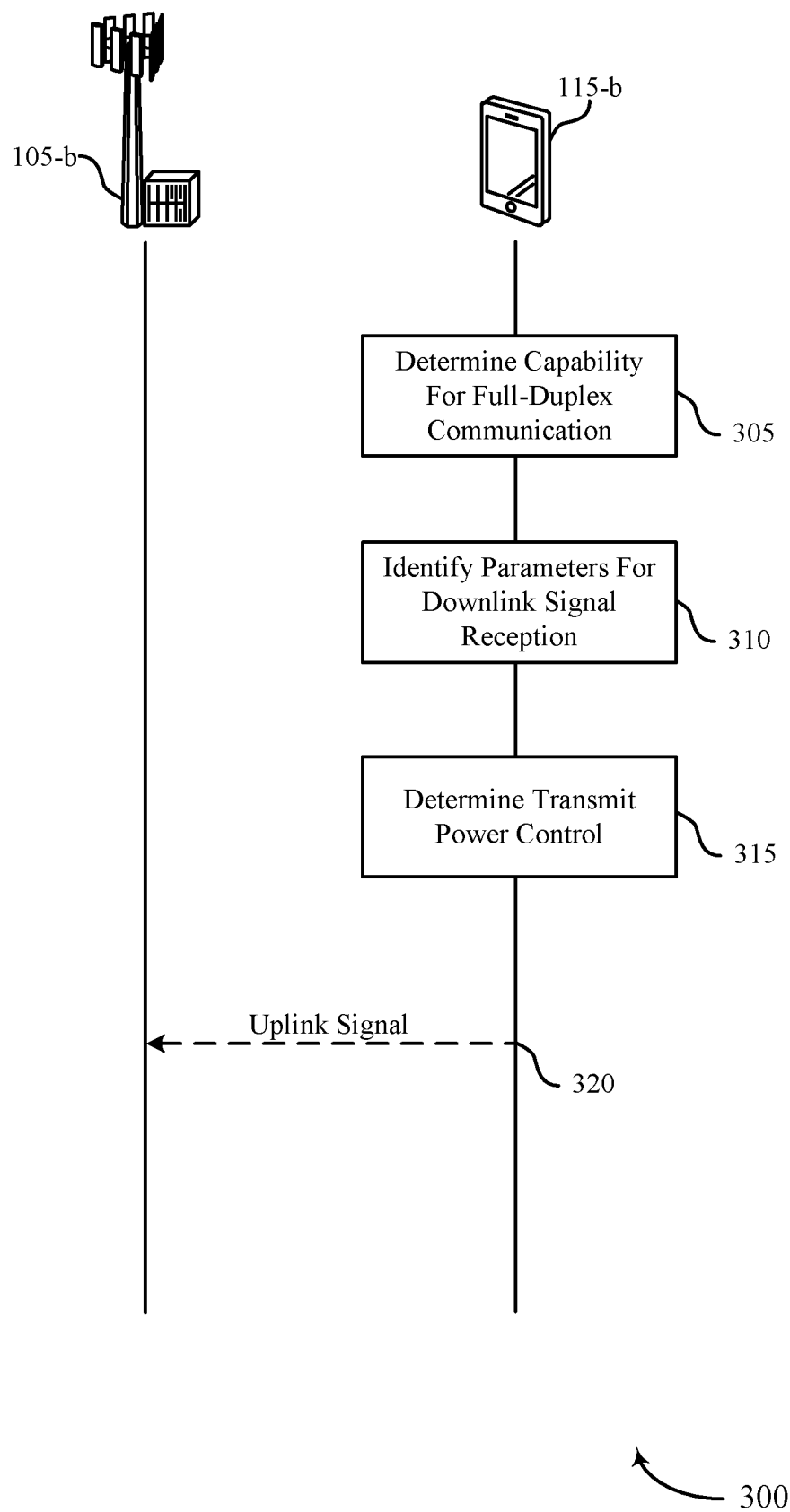
FIG. 3 illustrates an example of a process flow that supports power control in full duplex communication in accordance with aspects of the present disclosure.

FIG. 3 illustrates an example of a process flow 300 that supports power control in full duplex communication in accordance with aspects of the present disclosure. The process flow 300 may include a UE 115-*b* and base station 105-*b*, which may be examples of the corresponding devices described with reference to FIGS. 1 and 2. The UE 115-*b* may implement one or more methods for determining a transmit power control associated with uplink signaling, as discussed herein. Alternative examples of the following may be implemented, where some steps may be performed in a different order than described or not performed at all. In some examples, steps may include additional features not mentioned below, or further steps may be added.

UE 115-*b* and base station 105-*b* may establish a communication link within a supported coverage area of a wireless communications system. In some examples, the wireless communications system may correspond to a NR system and may utilize extensions to mmW frequency bandwidth spectrum over a channel associated with the communication link. As part of the supported extensions (e.g., mmW operations) at the wireless communications system, the UE 115-*b* may experience sufficient antenna isolation for communications of downlink and uplink data traffic. For example, the UE 115-*b* may support downlink signal reception and uplink signal transmission on beams associated with distinct antenna arrays or patches. The antenna isolation may be based on a MaxSNR or BLER target at the UE 115-*b* for decoding potential downlink transmissions, while supporting uplink transmission.

At 305, the UE 115-*b* may determine capability for full-duplex communication on resources of the communication link, and based on the supported antenna isolation. The full-duplex scheme may include simultaneous transmission and receive operations at the UE 115-*b* over a single channel. In some examples, the full-duplex scheme may be part of a slot format on the channel. For example, one or more slots within the channel allocation may be formatted for full-duplex communication with one or more alternative slots configured for half-duplex communication. The one or more slots formatted for full-duplex communication may include a set of resource blocks for sensing the channel (i.e., for downlink signal reception) and an alternative set of resource blocks for uplink signal transmission. The full-duplex scheme may enable increased signaling capacity and enhanced spectral efficiency on the channel due to bidirectional utilization of resources within the full TTI.

At 310, the UE 115-*b* may sense the channel for potential downlink signal reception from the base station 105-*b*. As part of the channel sensing, the UE 115-*b* may identify a set of parameters associated with potential downlink signal reception. In some examples, the set of parameters may be configured at the UE 115-*b*. In other examples, the UE 115-*b* may receive the set of parameters via downlink signaling, including an RRC configuration message, DCI indication, or MAC CE transmission from the base station 105-*b*. The UE 115-*b* may compute a MaxSNR or BLER target for decoding potential downlink transmissions based on the set of parameters. For example, the UE 115-*b* may compute a MaxSNR based on a received MCS code-rate, modulation format and allocated resource elements on the channel, or a TCI state pairing.

At 315, the UE 115-*b* may determine a transmit power control for uplink transmission on one or more slots formatted for full-duplex communication. The UE 115-*b* may consider downlink signal reception in determining the transmit power control. Specifically, the UE 115-*b* may configure the transmit power control determination to account for beamformed signaling at the UE 115-*b*, and may be based on signal reception quality for potential downlink transmissions.

In some examples, the UE 115-*b* may determine a configured transmit power, such as a maximum allowed transmit power, as part of the transmit power control. The UE 115-*b* may determine the configured transmit power based on the computed MaxSNR for downlink signal reception. In other examples, the UE 115-*b* may configure one or more parameters of a power determination (e.g., open-loop power determination, closed-loop power determination) or configure a command or rules (e.g., power control command, dropping rules, etc.) for the transmit power control. The UE 115-*b* may perform the configuration based on the full-duplex communication. In other examples, the UE 115-*b* may identify a resource allocation for uplink and downlink resources of the full-duplex communication, or configure a power control parameter (e.g., fractional power control parameter, autonomous power reduction, etc.). The UE 115-*b* may identify the resource allocation or configure the parameters based on a signal type, signal strength, or coding scheme associated with the potential downlink signal.

Based on the determination, at 320, the UE 115-*b* may either perform uplink transmission on a resource block allocation of the formatted slots or forgo uplink transmission. In some examples, the UE 115-*b* may forgo uplink transmission based on signaling interference to downlink reception and according to one or more configured dropping rules. In other examples, the UE 115-*b* may simultaneously sense the channel (i.e., for potential downlink signal reception) and perform the uplink transmission within the one or more slots formatted for full-duplex communication. The uplink transmission may be configured to the determined transmit power control, and may be based on signal reception quality for potential downlink transmissions, as described herein.

Due to the supported capability for simultaneous transmission and reception on the channel, the full-duplex scheme may enable one or more advantages for communication at the UE 115-*b*. Specifically, the UE 115-*b* may experience increased (e.g., doubled) spectral efficiency in communication on the channel as well as increased throughput and reduced latency in transmission and reception. In addition, the transmit power control determination for full-duplex communications may enable a configured transmit power for uplink signaling without compromising downlink signal reception quality.

Figure 4:
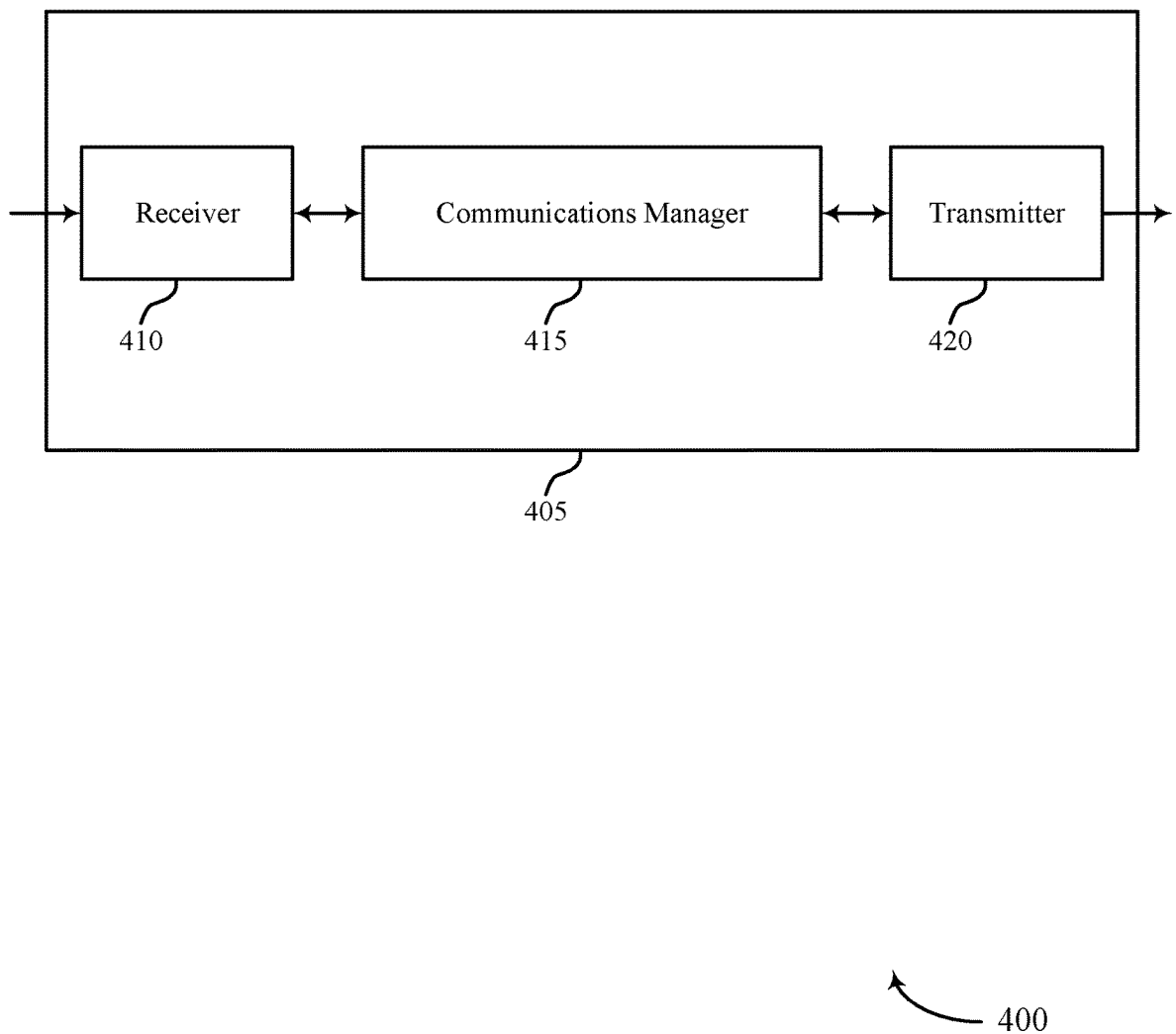
FIGS. 4 and 5 show block diagrams of devices that support power control in full duplex communication in accordance with aspects of the present disclosure.

FIG. 4 shows a block diagram 400 of a device 405 that supports power control in full duplex communication in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to power control in full duplex communication, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a first set of parameters associated with a potential downlink signal from a base station, determine a transmit power control for a first uplink signal in full-duplex communication over a carrier, and transmit, to the base station, the first uplink signal in a first slot formatted for the full-duplex communication. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
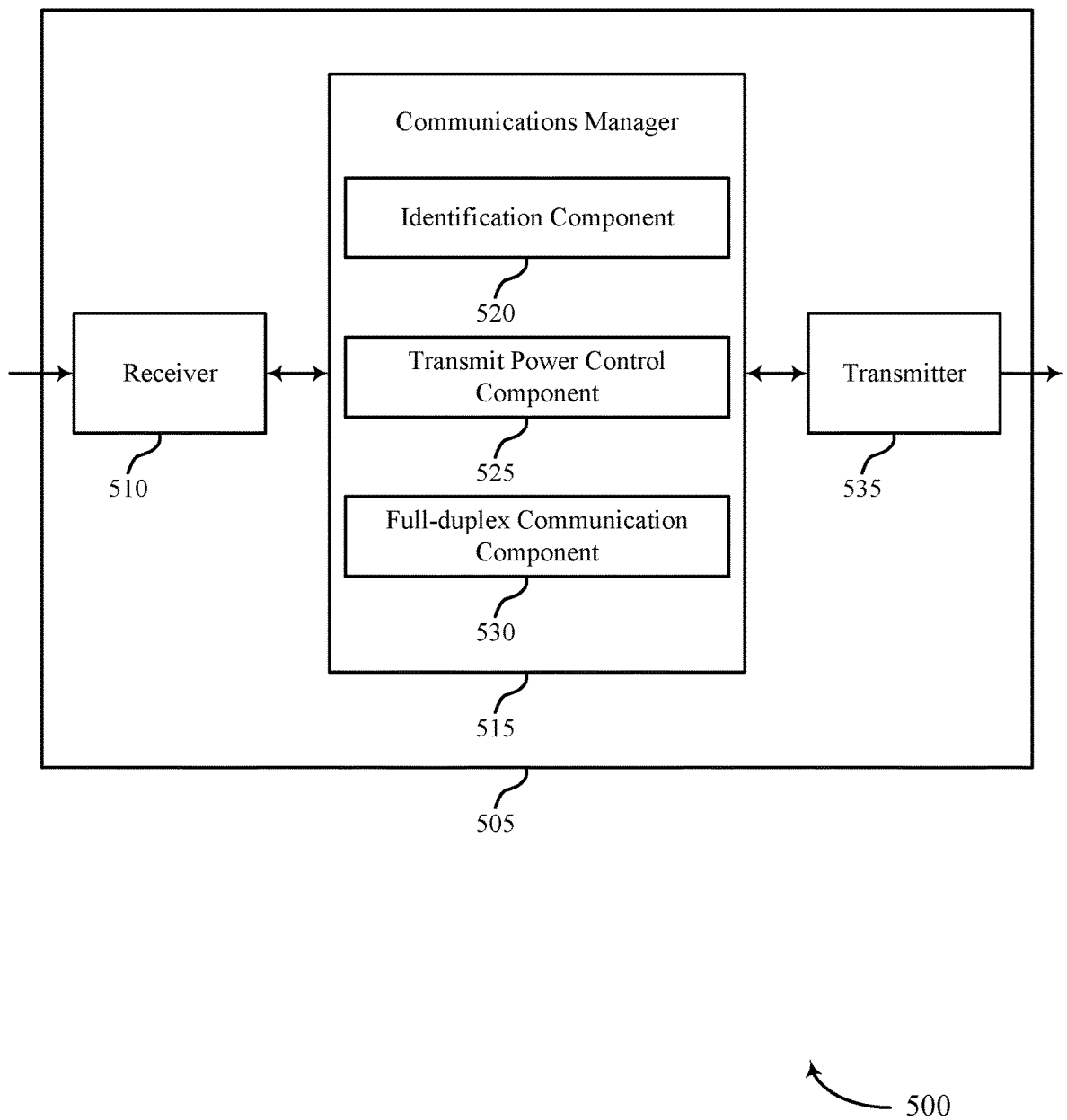

FIG. 5 shows a block diagram 500 of a device 505 that supports power control in full duplex communication in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to power control in full duplex communication, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an identification component 520, a transmit power control component 525, and a full-duplex communication component 530. The communications manager 515 may be an example of aspects of the communications manager 710 described herein.

The identification component 520 may identify a first set of parameters associated with a potential downlink signal from a base station.

The transmit power control component 525 may determine, based on the identifying, a transmit power control for a first uplink signal in full-duplex communication over a carrier.

The full-duplex communication component 530 may transmit, to the base station, the first uplink signal in a first slot formatted for the full-duplex communication.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
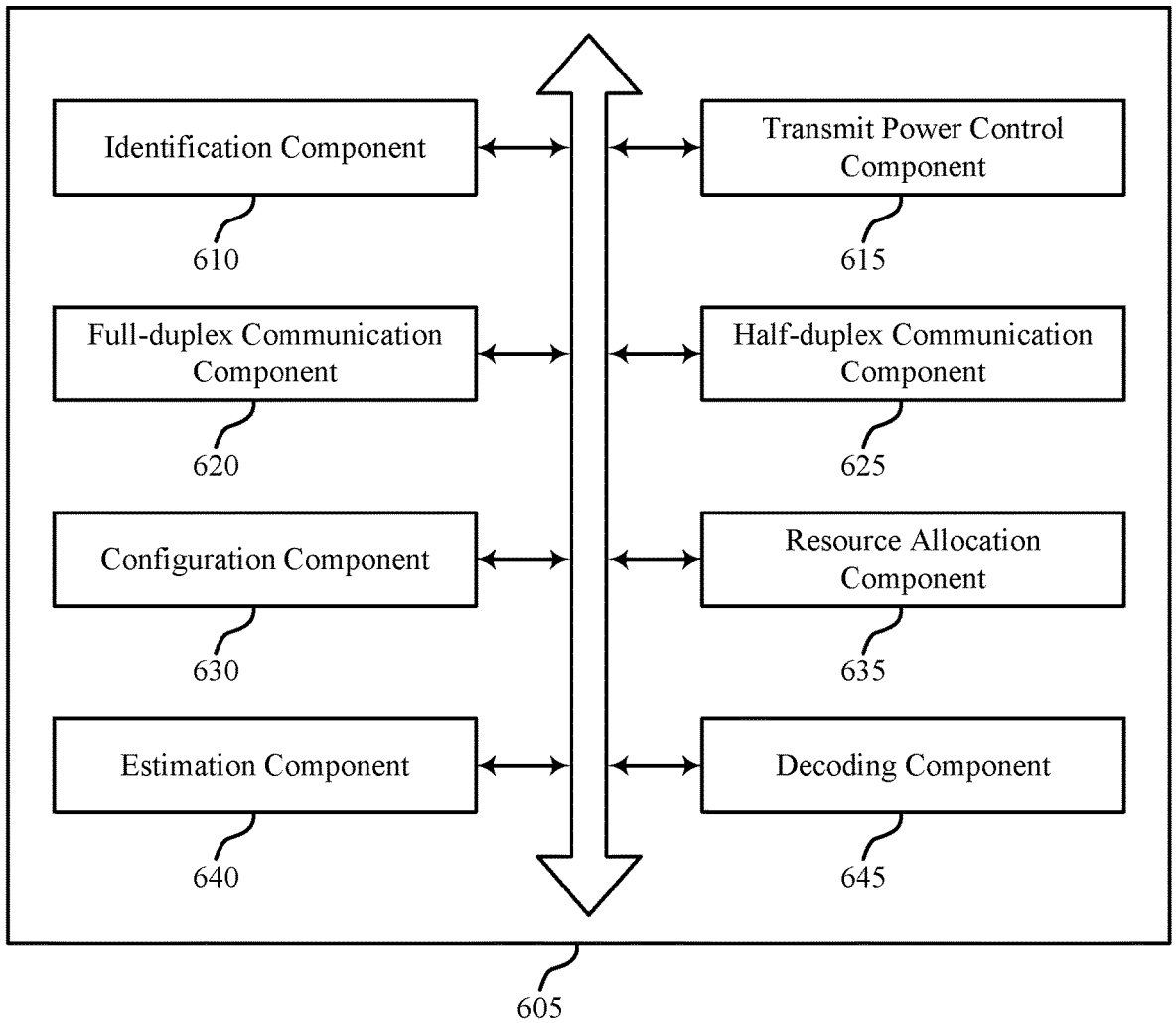
FIG. 6 shows a block diagram of a communications manager that supports power control in full duplex communication in accordance with aspects of the present disclosure.

FIG. 6 shows a block diagram 600 of a communications manager 605 that supports power control in full duplex communication in accordance with aspects of the present disclosure. The communications manager 605 may be an example of aspects of a communications manager 415, a communications manager 515, or a communications manager 710 described herein. The communications manager 605 may include an identification component 610, a transmit power control component 615, a full-duplex communication component 620, a half-duplex communication component 625, a configuration component 630, a resource allocation component 635, an estimation component 640, and a decoding component 645. Each of these modules may communicate, directly or indirectly, with one another (e.g., via one or more buses).

The identification component 610 may identify a first set of parameters associated with a potential downlink signal from a base station. In some examples, the identification component 610 may identify a second set of parameters associated with the UE, the second set of parameters including at least a power class and a maximum power reduction for the full-duplex communication.

In some examples, the identification component 610 may identify a channel type of the potential downlink signal. In some examples, the identification component 610 may receive the potential downlink signal on resources of the carrier. In some examples, the identification component 610 may identify the first set of parameters or the second set of parameters based on processing the potential downlink signal. In some examples, the first set of parameters are configured at the UE or indicated to the UE via a radio resource control indication, downlink control information, a control element of medium access control, or a combination thereof.

The transmit power control component 615 may determine, based on the identifying, a transmit power control for a first uplink signal in full-duplex communication over a carrier. In some examples, the transmit power control component 615 may determine a transmit power control for a second uplink signal in half-duplex communication over the carrier.

In some examples, the determining further includes determining a configured transmit power for the UE based on identifying the first set of parameters and identifying the second set of parameters. In some examples, the transmit power control component 615 the determining is based on the configuring. In some examples, the transmit power control component 615 the determining is based on identifying a resource assignment.

In some examples, the determining further includes determining a compensation parameter of the transmit power control based on identifying and the estimating a pathloss on the channel. In some examples, the determining further includes determining a power reduction for the transmit power control based on identifying the first set of parameters and identifying the channel type.

In some examples, the configured transmit power includes a maximum allowed transmit power at the UE. In some examples, the reference power determination includes an open loop power determination or a closed loop power determination. In some examples, the compensation parameter includes a fractional power control parameter. In some examples, the power control command includes a power control step size for transmitting the first uplink signal in the first slot. In some examples, the transmit power control includes a physical uplink shared channel transmission power or a physical uplink control channel transmission power for the full-duplex communication.

The full-duplex communication component 620 may transmit, to the base station, the first uplink signal in a first slot formatted for the full-duplex communication. In some examples, the full-duplex communication component 620 may transmit, to the base station, a signal indication of the power reduction.

The half-duplex communication component 625 may transmit the second uplink signal in a second slot formatted for the half-duplex communication. In some examples, the half-duplex communication is configured for time division duplex multiplexing or frequency division duplex multiplexing over resources of the carrier.

The configuration component 630 may configure a second set of parameters for a reference power determination associated with the full-duplex communication. In some examples, the configuration component 630 may configure a second set of parameters for a power control command associated with the full-duplex communication.

The resource allocation component 635 may identify a resource assignment of the carrier for the full-duplex communication. In some examples, the resource assignment includes at least one of a number of resource blocks for the first uplink signal, a number of resource blocks for the potential downlink signal, or a resource block allocation between the first uplink signal and the potential downlink signal.

The estimation component 640 may estimate a pathloss of the potential downlink signal for the full-duplex communication.

The decoding component 645 may determine a maximum signal to noise ratio to decode the potential downlink signal, the maximum signal to noise ratio included in the first set of parameters. In some examples, the decoding component 645 may determine the maximum signal to noise ratio is based on one or more additional parameters of the first set of parameters, the one or more additional parameters including a modulation coding scheme, a code-rate, a transmission quality of service, a modulation format, allocated resource elements, or a transmission configuration indicator state pairing for the full-duplex communication.

In some examples, the UE supports millimeter wave communications over a set of configured antennas.

Figure 7:
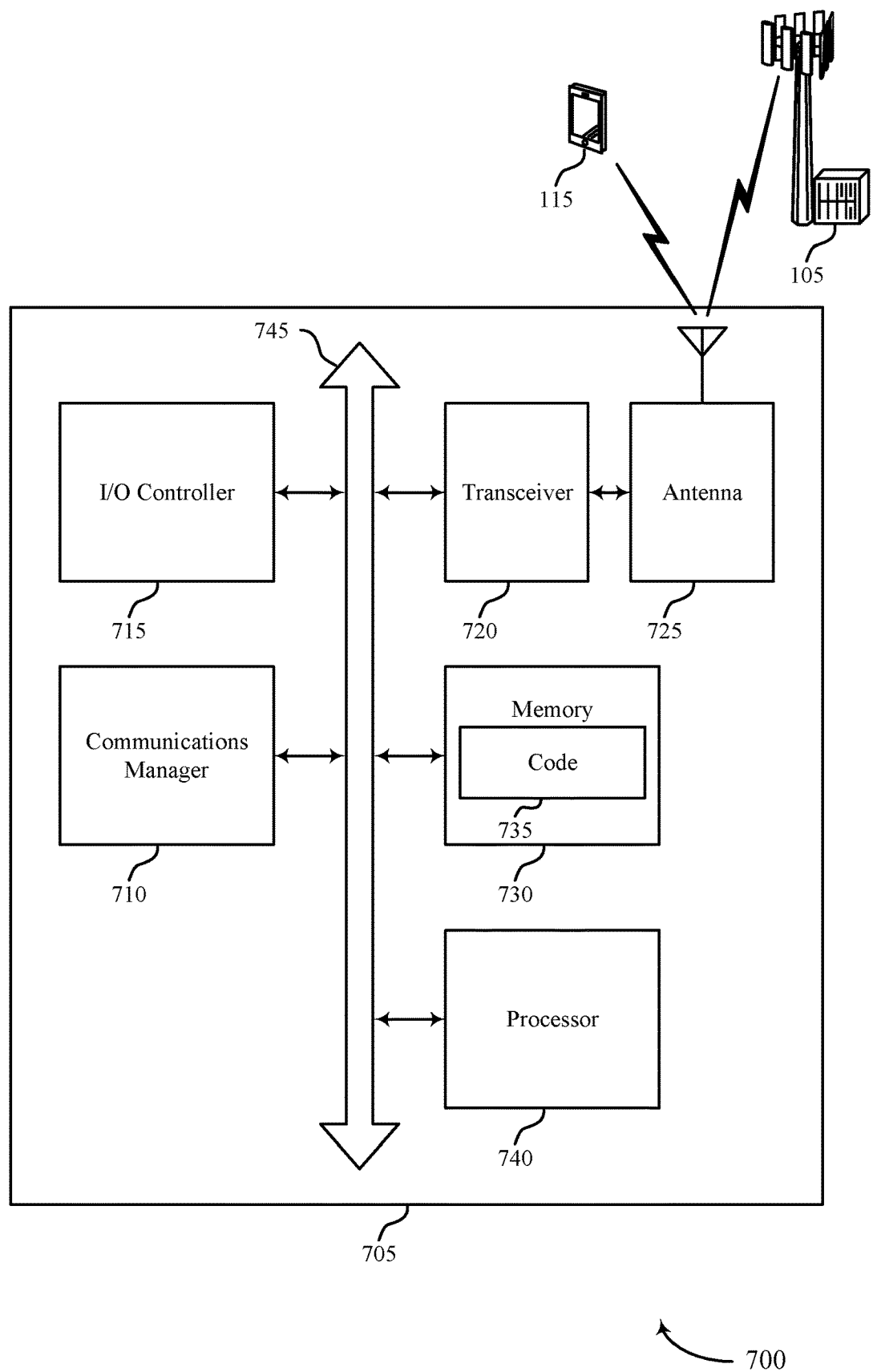
FIG. 7 shows a diagram of a system including a device that supports power control in full duplex communication in accordance with aspects of the present disclosure.

FIG. 7 shows a diagram of a system 700 including a device 705 that supports power control in full duplex communication in accordance with aspects of the present disclosure. The device 705 may be an example of or include the components of device 405, device 505, or a UE 115 as described herein. The device 705 may include components for bidirectional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a first set of parameters associated with a potential downlink signal from a base station, determine, based on the identifying, a transmit power control for a first uplink signal in full-duplex communication over a carrier, and transmit, to the base station, the first uplink signal in a first slot formatted for the full-duplex communication.

The I/O controller 715 may manage input and output signals for the device 705. The I/O controller 715 may also manage peripherals not integrated into the device 705. In some examples, the I/O controller 715 may represent a physical connection or port to an external peripheral. In some examples, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some examples, the I/O controller 715 may be implemented as part of a processor. In some examples, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some examples, the wireless device may include a single antenna 725. However, in some examples the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some examples, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting power control in full duplex communication).

The code 735 may include instructions to implement aspects of the present disclosure, including instructions to support wireless communications. The code 735 may be stored in a non-transitory computer-readable medium such as system memory or other type of memory. In some examples, the code 735 may not be directly executable by the processor 740 but may cause a computer (e.g., when compiled and executed) to perform functions described herein.

Figure 8:
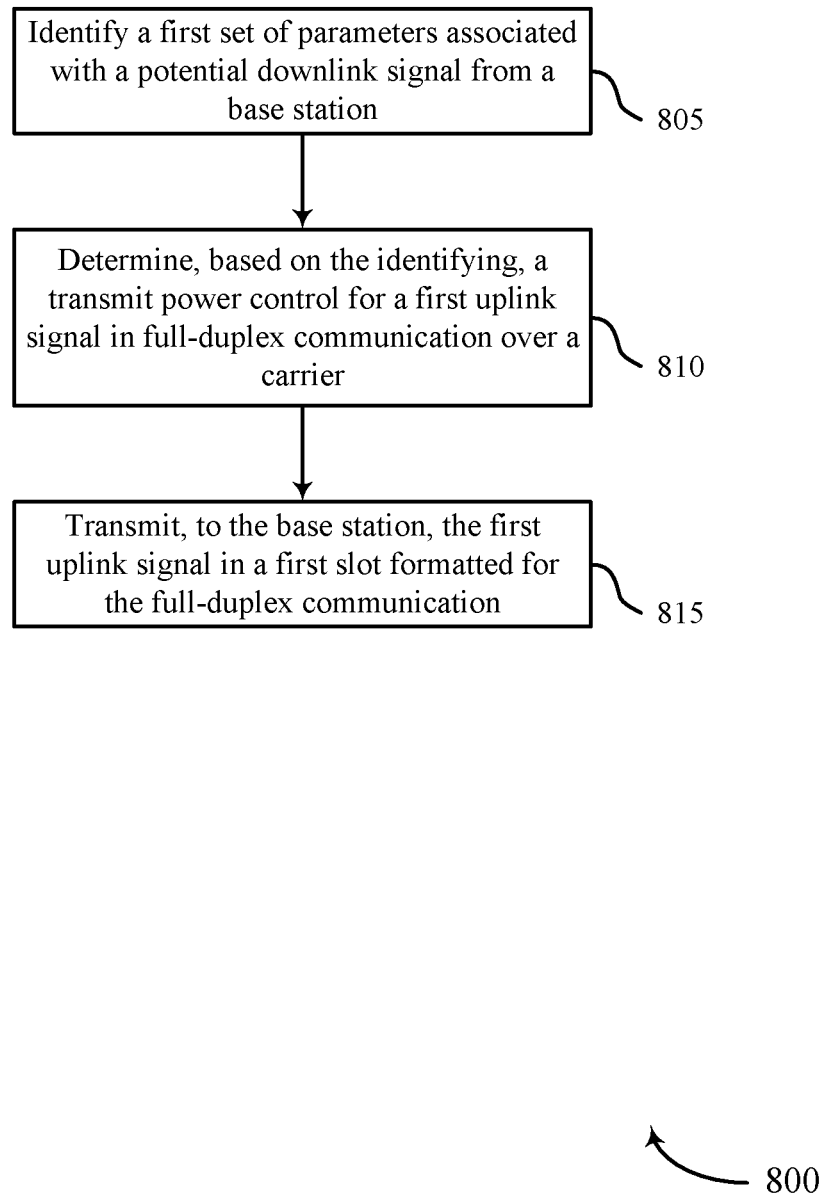
FIGS. 8 through 10 show flowcharts illustrating methods that support power control in full duplex communication in accordance with aspects of the present disclosure.

FIG. 8 shows a flowchart illustrating a method 800 that supports power control in full duplex communication in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may identify a first set of parameters associated with a potential downlink signal from a base station. The operations of 805 may be performed according to the methods described herein. In some examples, aspects of the operations of 805 may be performed by an identification component as described with reference to FIGS. 4 through 7.

At 810, the UE may determine, based on the identifying, a transmit power control for a first uplink signal in full-duplex communication over a carrier. The operations of 810 may be performed according to the methods described herein. In some examples, aspects of the operations of 810 may be performed by a transmit power control component as described with reference to FIGS. 4 through 7.

At 815, the UE may transmit, to the base station, the first uplink signal in a first slot formatted for the full-duplex communication. The operations of 815 may be performed according to the methods described herein. In some examples, aspects of the operations of 815 may be performed by a full-duplex communication component as described with reference to FIGS. 4 through 7.

Figure 9:
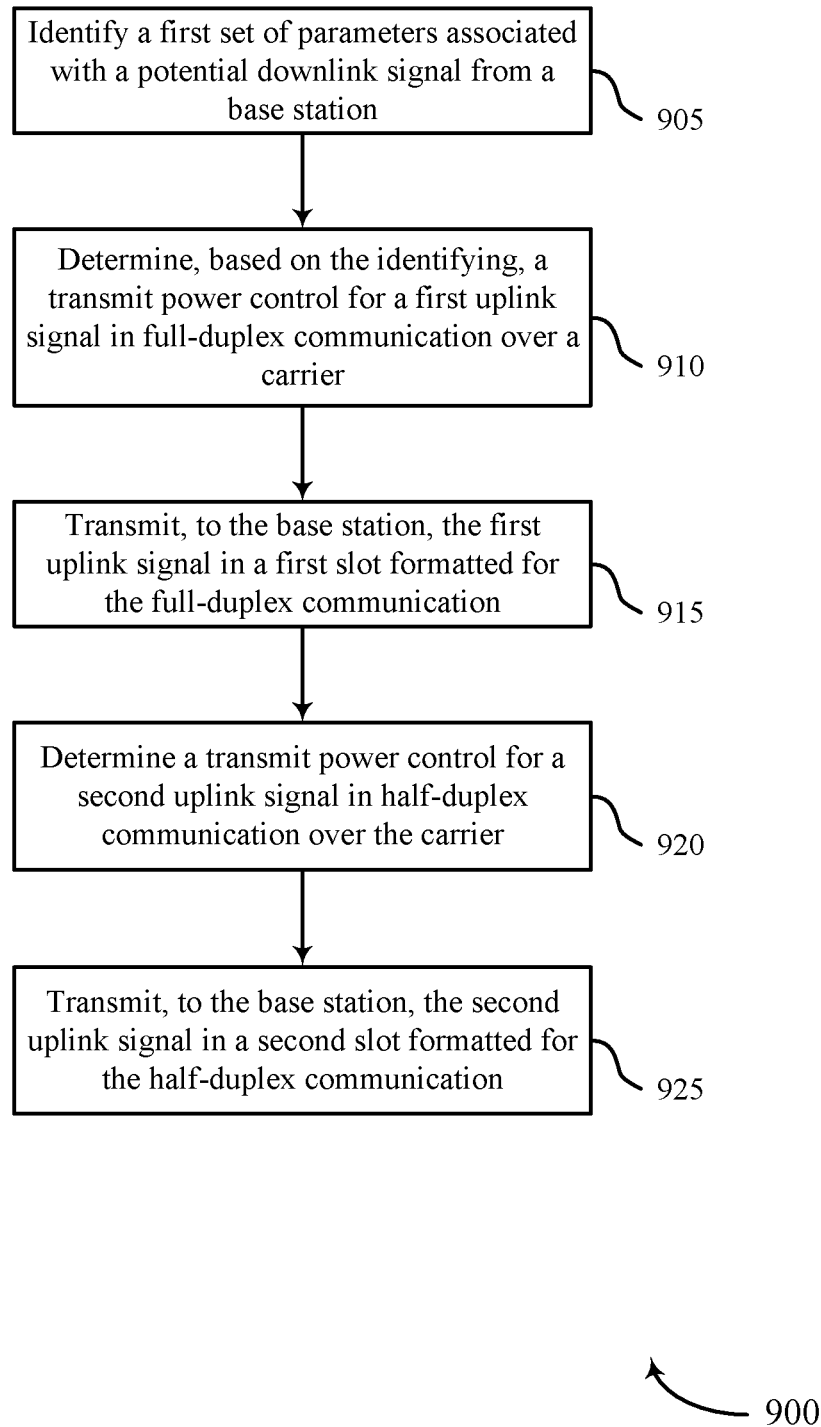

FIG. 9 shows a flowchart illustrating a method 900 that supports power control in full duplex communication in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may identify a first set of parameters associated with a potential downlink signal from a base station. The operations of 905 may be performed according to the methods described herein. In some examples, aspects of the operations of 905 may be performed by an identification component as described with reference to FIGS. 4 through 7.

At 910, the UE may determine, based on the identifying, a transmit power control for a first uplink signal in full-duplex communication over a carrier. The operations of 910 may be performed according to the methods described herein. In some examples, aspects of the operations of 910 may be performed by a transmit power control component as described with reference to FIGS. 4 through 7.

At 915, the UE may transmit, to the base station, the first uplink signal in a first slot formatted for the full-duplex communication. The operations of 915 may be performed according to the methods described herein. In some examples, aspects of the operations of 915 may be performed by a full-duplex communication component as described with reference to FIGS. 4 through 7.

At 920, the UE may determine a transmit power control for a second uplink signal in half-duplex communication over the carrier. The operations of 920 may be performed according to the methods described herein. In some examples, aspects of the operations of 920 may be performed by a transmit power control component as described with reference to FIGS. 4 through 7.

At 925, the UE may transmit the second uplink signal in a second slot formatted for the half-duplex communication. The operations of 925 may be performed according to the methods described herein. In some examples, aspects of the operations of 925 may be performed by a half-duplex communication component as described with reference to FIGS. 4 through 7.

Figure 10:
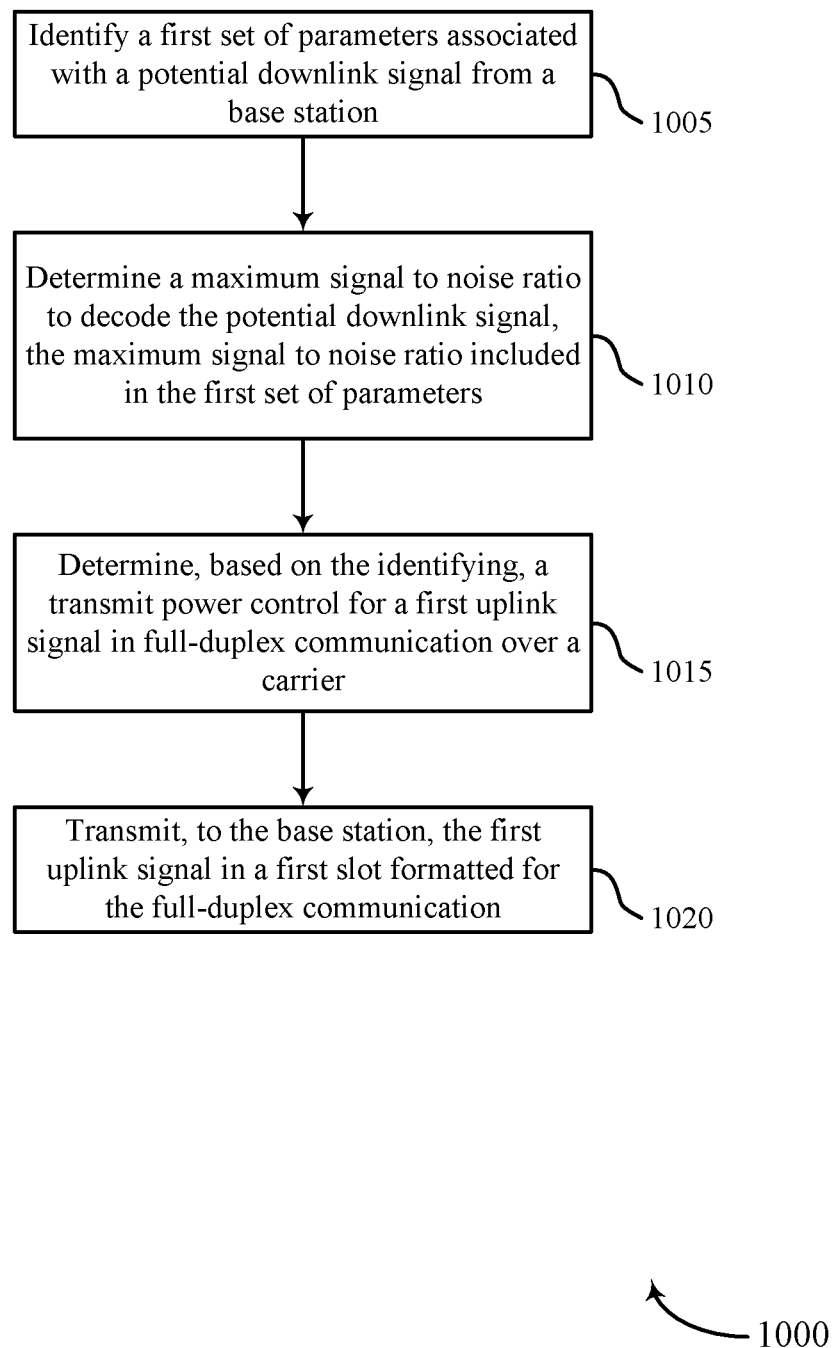

FIG. 10 shows a flowchart illustrating a method 1000 that supports power control in full duplex communication in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may identify a first set of parameters associated with a potential downlink signal from a base station. The operations of 1005 may be performed according to the methods described herein. In some examples, aspects of the operations of 1005 may be performed by an identification component as described with reference to FIGS. 4 through 7.

At 1010, the UE may determine a maximum signal to noise ratio to decode the potential downlink signal, the maximum signal to noise ratio included in the first set of parameters. The operations of 1010 may be performed according to the methods described herein. In some examples, aspects of the operations of 1010 may be performed by a decoding component as described with reference to FIGS. 4 through 7.

At 1015, the UE may determine a transmit power control for a first uplink signal in full-duplex communication over a carrier. The operations of 1015 may be performed according to the methods described herein. In some examples, aspects of the operations of 1015 may be performed by a transmit power control component as described with reference to FIGS. 4 through 7.

At 1020, the UE may transmit, to the base station, the first uplink signal in a first slot formatted for the full-duplex communication. The operations of 1020 may be performed according to the methods described herein. In some examples, aspects of the operations of 1020 may be performed by a full-duplex communication component as described with reference to FIGS. 4 through 7.

Described herein are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method for wireless communication at a UE that includes identifying a first set of parameters associated with a potential downlink signal from a base station, determining, based on the identifying, a transmit power control for a first uplink signal in full-duplex communication over a carrier, and transmitting, to the base station, the first uplink signal in a first slot formatted for the full-duplex communication.

In Example 2, the method of Example 1 further includes determining a transmit power control for a second uplink signal in half-duplex communication over the carrier, and transmitting the second uplink signal in a second slot formatted for the half-duplex communication.

In Example 3, the method of any of Examples 1-2 further includes that the half-duplex communication may be configured for time division duplex multiplexing or frequency division duplex multiplexing over resources of the carrier.

In Example 4, the method of any of Examples 1-3 further includes identifying a second set of parameters associated with the UE, the second set of parameters including at least a power class and a maximum power reduction for the full-duplex communication, and where the determining further includes determining a configured transmit power for the UE based on identifying the first set of parameters and identifying the second set of parameters.

In Example 5, the method of any of Examples 1-4 further includes that the configured transmit power includes a maximum allowed transmit power at the UE.

In Example 6, the method of any of Examples 1-5 further includes configuring a second set of parameters for a reference power determination associated with the full-duplex communication, and where the determining may be based on the configuring.

In Example 7, the method of any of Examples 1-6 further includes that the reference power determination includes an open loop power determination or a closed loop power determination.

In Example 8, the method of any of Examples 1-7 further includes identifying a resource assignment of the carrier for the full-duplex communication, and where the determining may be based on identifying the resource assignment.

In Example 9, the method of any of Examples 1-8 further includes that the resource assignment includes at least one of a number of resource blocks for the first uplink signal, a number of resource blocks for the potential downlink signal, or a resource block allocation between the first uplink signal and the potential downlink signal.

In Example 10, the method of any of Examples 1-9 further includes estimating a pathloss of the potential downlink signal for the full-duplex communication, and where the determining further includes determining a compensation parameter of the transmit power control based on the identifying and the estimating.

In Example 11, the method of any of Examples 1-10 further includes that the compensation parameter includes a fractional power control parameter.

In Example 12, the method of any of Examples 1-11 further includes configuring a second set of parameters for a power control command associated with the full-duplex communication, and where the determining may be based on the configuring.

In Example 13, the method of any of Examples 1-12 further includes that the power control command includes a power control step size for transmitting the first uplink signal in the first slot.

In Example 14, the method of any of Examples 1-13 further includes identifying a channel type of the potential downlink signal, and where the determining further includes determining a power reduction for the transmit power control based on identifying the first set of parameters and identifying the channel type.

In Example 15, the method of any of Examples 1-14 further includes transmitting, to the base station, a signal indication of the power reduction.

In Example 16, the method of any of Examples 1-15 further includes receiving the potential downlink signal on resources of the carrier, and where the identifying may be based on processing the potential downlink signal.

In Example 17, the method of any of Examples 1-16 further includes determining a maximum signal to noise ratio to decode the potential downlink signal, the maximum signal to noise ratio included in the first set of parameters.

In Example 18, the method of any of Examples 1-17 further includes that determining the maximum signal to noise ratio may be based on one or more additional parameters of the first set of parameters, the one or more additional parameters including a modulation coding scheme, a code-rate, a transmission quality of service, a modulation format, allocated resource elements, or a transmission configuration indicator state pairing for the full-duplex communication.

In Example 19, the method of any of Examples 1-18 further includes that the first set of parameters may be configured at the UE or indicated to the UE via one or more of a radio resource control indication, downlink control information, a control element of medium access control.

In Example 20, the method of any of Examples 1-19 further includes that the transmit power control includes a physical uplink shared channel transmission power or a physical uplink control channel transmission power for the full-duplex communication.

In Example 21, the method of any of Examples 1-20 further includes that the UE supports millimeter wave communications over a set of configured antennas.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a resource assignment of a carrier for full-duplex communication;
   determining a signal to noise ratio based at least in part on a first set of parameters, the signal to noise ratio associated with decoding a potential downlink signal from a network entity;
   determining a transmit power control for a first uplink signal in the full-duplex communication over the carrier, based at least in part on the signal to noise ratio, a subcarrier spacing of the resource assignment, and a power reduction that is based at least in part on a channel type for the potential downlink signal, wherein the channel type comprises one of a physical downlink shared channel or a physical downlink control channel; and
   transmitting, to the network entity, the first uplink signal in a first slot formatted for the full-duplex communication.

2. The method of claim 1, further comprising:
   determining a transmit power control for a second uplink signal in half-duplex communication over the carrier using a transmit power control command that is based at least in part on a slot format; and
   transmitting the second uplink signal in a second slot formatted for the half-duplex communication.

3. The method of claim 2, wherein the half-duplex communication is configured for time division duplex multiplexing or frequency division duplex multiplexing over resources of the carrier.

4. The method of claim 1, further comprising:
   identifying a second set of parameters associated with the UE, the second set of parameters comprising at least a power class and a maximum power reduction for the full-duplex communication; and
   wherein the determining the transmit power control for the first uplink signal further comprises determining a configured transmit power for the UE based at least in part on identifying the second set of parameters.

5. The method of claim 4, wherein the configured transmit power comprises a maximum allowed transmit power at the UE.

6. The method of claim 1, further comprising:
   configuring a second set of parameters for a reference power determination associated with the full-duplex communication; and
   wherein the determining the transmit power control for the first uplink signal is based at least in part on the configuring.

7. The method of claim 6, wherein the reference power determination comprises an open loop power determination or a closed loop power determination.

8. The method of claim 1, wherein the resource assignment comprises at least one of a number of resource blocks for the first uplink signal, a number of resource blocks for the potential downlink signal, or a resource block allocation between the first uplink signal and the potential downlink signal.

9. The method of claim 1, further comprising:
   estimating a pathloss of the potential downlink signal for the full-duplex communication; and
   wherein the determining the transmit power control for the first uplink signal further comprises determining a compensation parameter of the transmit power control based at least in part on the estimating.

10. The method of claim 9, wherein the compensation parameter comprises a fractional power control parameter.

11. The method of claim 1, further comprising:
    configuring a second set of parameters for a power control command associated with the full-duplex communication; and
    wherein the determining the transmit power control for the first uplink signal is based at least in part on the configuring.

12. The method of claim 11, wherein the power control command comprises a power control step size for transmitting the first uplink signal in the first slot.

13. The method of claim 1, further comprising:
transmitting, to the network entity, a signal indication of the power reduction.

14. The method of claim 1, further comprising:
receiving the potential downlink signal on resources of the carrier; and
wherein the signal to noise ratio is based at least in part on processing the potential downlink signal.

15. The method of claim 1, wherein:
the first set of parameters comprises at least one of a modulation coding scheme, a code-rate, a transmission quality of service, a modulation format, or allocated resource elements.

16. The method of claim 1, wherein the first set of parameters are configured at the UE or indicated to the UE via one or more of a radio resource control indication, downlink control information, a control element of medium access control.

17. The method of claim 1, wherein the transmit power control comprises a physical uplink shared channel transmission power or a physical uplink control channel transmission power for the full-duplex communication.

18. The method of claim 1, wherein the UE supports millimeter wave communications over a set of configured antennas.

19. The method of claim 1, wherein the first set of parameters comprises a transmission configuration indicator state pairing for the full-duplex communication.

20. An apparatus for wireless communication, comprising:
a processor, memory in electronic communication with the processor; and
instructions stored in the memory and executable by the processor to cause the apparatus to:
receive a resource assignment of a carrier for full-duplex communication;
determine a signal to noise ratio based at least in part on a first set of parameters, the signal to noise ratio associated with decoding a potential downlink signal from a network entity;
determine a transmit power control for a first uplink signal in the full-duplex communication over the carrier, based at least in part on the signal to noise ratio, a subcarrier spacing of the resource assignment, and a power reduction that is based at least in part on a channel type for the potential downlink signal, wherein the channel type comprises one of a physical downlink shared channel or a physical downlink control channel; and
transmit, to the network entity, the first uplink signal in a first slot formatted for the full-duplex communication.

21. The apparatus of claim 20, wherein the instructions are further executable by the processor to cause the apparatus to:
determine a transmit power control for a second uplink signal in half-duplex communication over the carrier using a transmit power control command that is based at least in part on a slot format; and
transmit the second uplink signal in a second slot formatted for the half-duplex communication.

22. The apparatus of claim 20, wherein the instructions are further executable by the processor to cause the apparatus to:
identify a second set of parameters associated with the apparatus, the second set of parameters comprising at least a power class and a maximum power reduction for the full-duplex communication; and
determine a configured transmit power for the apparatus based at least in part on the second set of parameters.

23. The apparatus of claim 22, wherein the configured transmit power comprises a maximum allowed transmit power at the UE.

24. The apparatus of claim 22, wherein the UE supports millimeter wave communications over a set of configured antennas.

25. The apparatus of claim 21, wherein the half-duplex communication is configured for time division duplex multiplexing or frequency division duplex multiplexing over resources of the carrier.

26. The apparatus of claim 21, wherein the transmit power control comprises a physical uplink shared channel transmission power or a physical uplink control channel transmission power for the full-duplex communication.

27. The apparatus of claim 20, wherein the instructions are further executable by the processor to cause the apparatus to:
configure a second set of parameters for a reference power determination associated with the full-duplex communication; and
wherein the instructions to determine the transmit power control for the first uplink signal are further executable by the processor to cause the apparatus to determine the transmit power control for the first uplink signal based at least in part on configuring the second set of parameters.

28. The apparatus of claim 20, wherein the instructions are further executable by the processor to cause the apparatus to:
estimate a pathloss of the potential downlink signal for the full-duplex communication; and
determine a compensation parameter of the transmit power control based at least in part on estimating the pathloss.

29. The apparatus of claim 28, wherein the compensation parameter comprises a fractional power control parameter.

30. The apparatus of claim 20, wherein the instructions are further executable by the processor to cause the apparatus to:
configure a second set of parameters for a power control command associated with the full-duplex communication; and
wherein the instructions to determine the transmit power control for the first uplink signal are further executable by the processor to cause the apparatus to determine the transmit power control for the first uplink signal based at least in part on configuring the second set of parameters.

31. The apparatus of claim 30, wherein the power control command comprises a power control step size for transmitting the first uplink signal in the first slot.

32. The apparatus of claim 20, wherein the first set of parameters comprises a transmission configuration indicator state pairing for the full-duplex communication.

33. The apparatus of claim 20, wherein the resource assignment comprises at least one of a number of resource blocks for the first uplink signal, a number of resource blocks for the potential downlink signal, or a resource block allocation between the first uplink signal and the potential downlink signal.

34. The apparatus of claim 20, wherein the instructions are further executable by the processor to cause the apparatus to:

transmit, to the network entity, a signal indication of the power reduction.

35. The apparatus of claim 20, wherein the instructions are further executable by the processor to cause the apparatus to:

receive the potential downlink signal on resources of the carrier; and wherein the signal to noise ratio is based at least in part on processing the potential downlink signal.

36. The apparatus of claim 20, wherein:

the first set of parameters comprises at least one of a modulation coding scheme, a code-rate, a transmission quality of service, a modulation format, or allocated resource elements.

37. The apparatus of claim 20, wherein the first set of parameters are configured at the UE or indicated to the UE via one or more of a radio resource control indication, downlink control information, a control element of medium access control.

38. An apparatus for wireless communication, comprising:

means for receiving a resource assignment of a carrier for full-duplex communication;

means for determining a signal to noise ratio based at least in part on a first set of parameters, the signal to noise ratio associated with decoding a potential downlink signal from a network entity;

means for determining a transmit power control for a first uplink signal in the full-duplex communication over the carrier, based at least in part on the signal to noise ratio, a subcarrier spacing of the resource assignment, and a power reduction that is based at least in part on a channel type for the potential downlink signal, wherein the channel type comprises one of a physical downlink shared channel or a physical downlink control channel; and means for transmitting, to the network entity, the first uplink signal in a first slot formatted for the full-duplex communication.

39. A non-transitory computer-readable medium storing code for wireless communication at a user equipment (UE), the code comprising instructions executable by a processor to:

receive a resource assignment of a carrier for full-duplex communication;

determine a signal to noise ratio based at least in part on a first set of parameters, the signal to noise ratio associated with decoding a potential downlink signal from a network entity;

determine a transmit power control for a first uplink signal in the full-duplex communication over the carrier, based at least in part on the signal to noise ratio, a subcarrier spacing of the resource assignment, and a power reduction that is based at least in part on a channel type for the potential downlink signal, wherein the channel type comprises one of a physical downlink shared channel or a physical downlink control channel; and transmit, to the network entity, the first uplink signal in a first slot formatted for the full-duplex communication.

* * * * *